US012505734B2

(12) United States Patent
Harada et al.

(10) Patent No.: US 12,505,734 B2
(45) Date of Patent: Dec. 23, 2025

(54) ROAD CONDITION MONITORING SYSTEM

(71) Applicant: TOYOTA JIDOSHA KABUSHIKI KAISHA, Toyota (JP)

(72) Inventors: Takahisa Harada, Nisshin (JP); Hiroshi Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 18/405,149

(22) Filed: Jan. 5, 2024

(65) Prior Publication Data

US 2024/0274002 A1 Aug. 15, 2024

(30) Foreign Application Priority Data

Feb. 14, 2023 (JP) ................................ 2023-020757

(51) Int. Cl.
*G08G 1/01* (2006.01)

(52) U.S. Cl.
CPC ......... *G08G 1/0141* (2013.01); *G08G 1/0112* (2013.01); *G08G 1/0133* (2013.01); *G08G 1/0145* (2013.01)

(58) Field of Classification Search
CPC .. G08G 1/0141; G08G 1/0112; G08G 1/0133; G08G 1/0145
USPC .......................................................... 701/117
See application file for complete search history.

(56) References Cited

U.S. PATENT DOCUMENTS

| | | | | |
|---|---|---|---|---|
| 5,757,287 A * | 5/1998 | Kitamura | G06T 7/248 | 340/936 |
| 7,818,204 B2 * | 10/2010 | Solomon | G08G 1/09675 | 705/13 |
| 9,041,553 B2 * | 5/2015 | Sako | G08G 1/0112 | 340/901 |
| 10,762,786 B1 * | 9/2020 | Dewey | G08G 1/04 | |
| 10,997,853 B2 * | 5/2021 | Katayama | G08G 1/096758 | |
| 11,530,925 B1 * | 12/2022 | Shields | G08G 1/164 | |
| 11,704,998 B2 * | 7/2023 | Huang | H04W 4/029 | 701/117 |
| 2007/0252725 A1 * | 11/2007 | Nishida | G08G 1/096758 | 340/905 |
| 2007/0282519 A1 * | 12/2007 | Emam | G08G 1/164 | 701/117 |

(Continued)

FOREIGN PATENT DOCUMENTS

JP 2009-217371 A 9/2009

*Primary Examiner* — Luis A Martinez Borrero
(74) *Attorney, Agent, or Firm* — Oliff PLC

(57) ABSTRACT

A road condition monitoring system includes vehicles and a server configured to communicate with the vehicles. Each of the vehicles is configured to, when an abnormality on a road is detected, transmit, to the server, notification data including a type of the abnormality, a detection position at which the abnormality is detected, and a detection time at which the abnormality is detected. The server includes a processor. The processor calculates an analysis value indicating a degree of influence on traffic congestion at the detection position based on the detection time. When a condition that the analysis value indicates a high degree of influence on the traffic congestion is satisfied, the processor transmits, to the vehicles, prediction data indicating that a possibility of occurrence of the traffic congestion at the detection position is high.

11 Claims, 3 Drawing Sheets

(56) References Cited

U.S. PATENT DOCUMENTS

2012/0065871 A1* 3/2012 Deshpande .......... G08G 1/0133 701/118
2012/0158276 A1* 6/2012 Kim ................ G08G 1/096758 701/119
2014/0278032 A1* 9/2014 Scofield ............... G08G 1/0129 701/118
2016/0171884 A1* 6/2016 Chen ........................ G01C 7/04 701/117
2016/0231746 A1* 8/2016 Hazelton .............. G05D 1/0274
2018/0376306 A1* 12/2018 Ramalho de Oliveira .................. G08G 1/0112
2019/0325742 A1* 10/2019 Xu ........................ G08G 1/0112
2022/0108614 A1* 4/2022 Mori ....................... G08G 1/005
2022/0230539 A1* 7/2022 Han .......................... G08G 1/04
2023/0083625 A1* 3/2023 Ucar ....................... G08G 1/166 701/117
2023/0256971 A1* 8/2023 Buda ....................... G08G 1/056 701/117
2023/0274634 A1* 8/2023 Takahashi .............. G06V 20/54 701/118
2023/0298460 A1* 9/2023 Cui ....................... G08G 1/0145 701/118
2024/0212083 A1* 6/2024 Pasch .................. G06F 21/6254

* cited by examiner

ROAD CONDITION MONITORING SYSTEM

CROSS-REFERENCE TO RELATED APPLICATION

This application claims priority to Japanese Patent Application No. 2023-020757 filed on Feb. 14, 2023, incorporated herein by reference in its entirety.

BACKGROUND

1. Technical Field

The present disclosure relates to a road condition monitoring system.

2. Description of Related Art

An information processing system disclosed in Japanese Unexamined Patent Application Publication No. 2009-217371 (JP 2009-217371 A) includes vehicles and an information center. The information center acquires pieces of detection data detected by the vehicles. The information center grasps whether traffic congestion has occurred on a road based on the pieces of detection data acquired from the vehicles, specifically, vehicle position information, vehicle speed, and the like.

The information processing system disclosed in JP 2009-217371 A can only grasp that the traffic congestion is currently present on the road, that is, the traffic congestion has already occurred. When a driver of a vehicle is only provided with information on the traffic congestion that has already occurred, there is a possibility that the driver of the vehicle cannot secure sufficient time to avoid the traffic congestion.

SUMMARY

A road condition monitoring system according to one aspect of the present disclosure includes vehicles and a server configured to communicate with the vehicles. Each of the vehicles is configured to, when an abnormality on a road is detected, transmit, to the server, notification data including a type of the abnormality, a detection position at which the abnormality is detected, and a detection time at which the abnormality is detected. The server includes one or more processors. The one or more processors are configured to, when the notification data is received, transmit, to the vehicles, preliminary report data indicating that the abnormality has occurred at the detection position. The one or more processors are configured to, when the notification data is received, calculate an analysis value indicating a degree of influence on traffic congestion at the detection position based on the detection time. The one or more processors are configured to, when a condition that the analysis value indicates a high degree of influence on the traffic congestion is satisfied, transmit, to the vehicles, prediction data indicating that a possibility of occurrence of the traffic congestion at the detection position is high.

According to the above configuration, when the vehicle has detected the abnormality on the road, the server can grasp that the abnormality has occurred. Since the server transmits information indicating that the abnormality has occurred on the road to each vehicle as the preliminary report data, a driver of each vehicle can predict by himself/herself that the traffic congestion may occur at the detection position.

The server calculates the analysis value indicating the degree of influence on the traffic congestion at the detection position separately from the transmission of the preliminary report data. When the condition that the analysis value indicates the high degree of influence on the traffic congestion is satisfied, the server transmits, to each vehicle, the prediction data indicating that the possibility of the occurrence of the traffic congestion is high. Therefore, the driver of each vehicle can grasp in advance not only that the abnormality has occurred on the road, but also that the possibility of the occurrence of the traffic congestion due to the abnormality is high.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Schematic Configuration of Road Condition Monitoring System

An embodiment of the present disclosure will be described below with reference to FIGS. 1 to 3. First, a schematic configuration of a road condition monitoring system 100 will be described.

Figure 1:
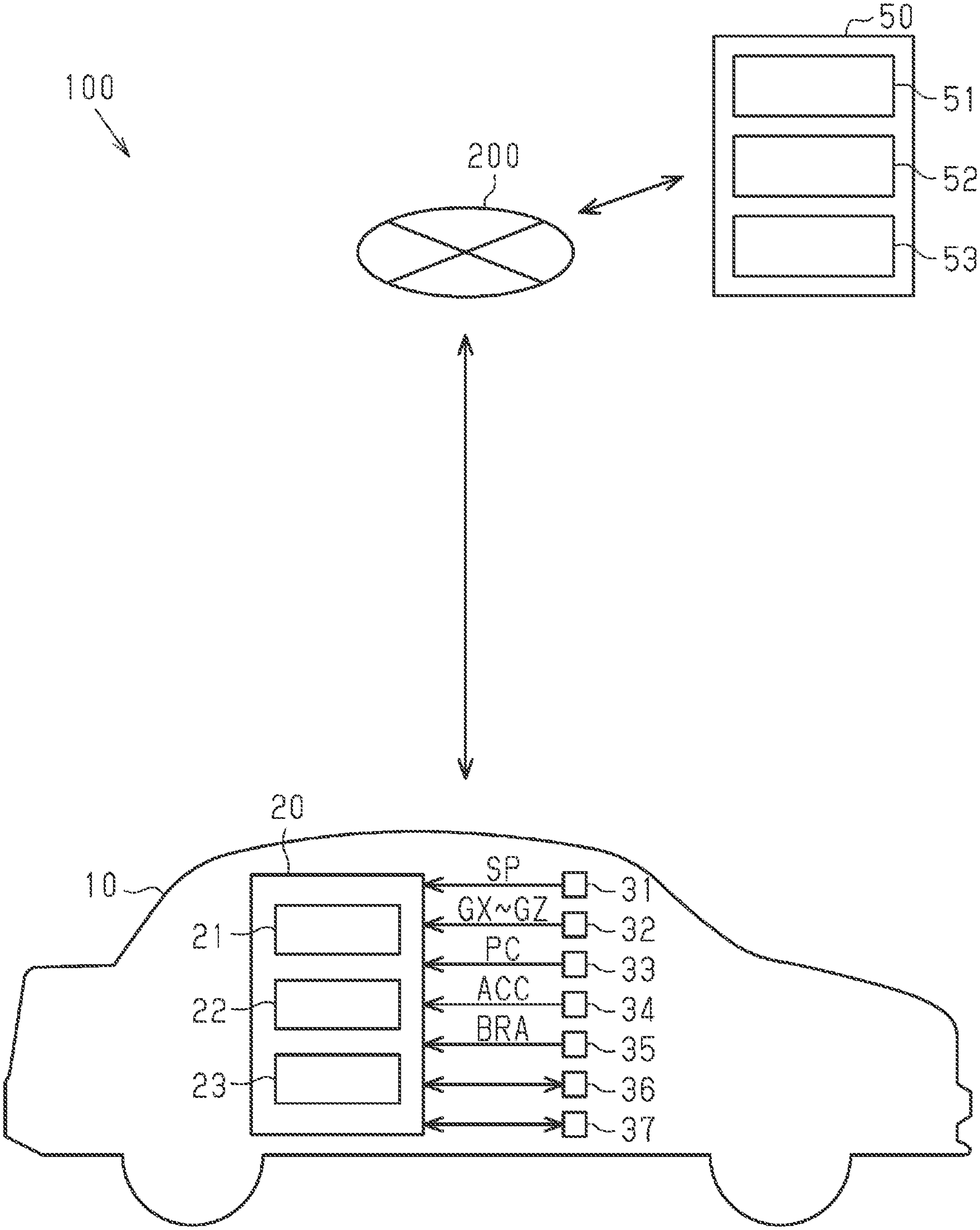
FIG. 1 is a schematic configuration diagram of a road condition monitoring system.

As shown in FIG. 1, the road condition monitoring system 100 includes vehicles 10. The vehicle 10 is, for example, an automobile owned by a user. In FIG. 1, only one vehicle 10 is illustrated as a representative.

The vehicle 10 includes a vehicle speed sensor 31, an acceleration sensor 32, a GNSS receiver 33, an accelerator operation amount sensor 34, and a brake operation amount sensor 35. The vehicle 10 also includes a brake system 36 and an airbag device 37.

The vehicle speed sensor 31 detects a vehicle speed SP that is a speed of the vehicle 10. The acceleration sensor 32 is a so-called three-axis sensor. That is, the acceleration sensor 32 can detect a longitudinal acceleration GX, a lateral acceleration GY, and a vertical acceleration GZ. The longitudinal acceleration GX is an acceleration along a longitudinal axis of the vehicle 10. The lateral acceleration GY is an acceleration along a lateral axis of the vehicle 10. The vertical acceleration GZ is an acceleration along a vertical axis of the vehicle 10.

The GNSS receiver 33 detects position coordinates PC that are coordinates of a point where the vehicle 10 is located through communication with GNSS satellites (not shown). GNSS is an abbreviation for "Global Navigation Satellite System".

The accelerator operation amount sensor 34 detects an accelerator operation amount ACC that is an operation amount of an accelerator pedal operated by a driver. The brake operation amount sensor 35 detects a brake operation amount BRA that is an operation amount of a brake pedal operated by the driver.

The brake system 36 includes a brake device and a brake control device. The brake device is a so-called mechanical brake device that mechanically brakes wheels of the vehicle 10. The brake control device performs control to prevent the wheels of the vehicle 10 from locking when the brake device suddenly brakes. That is, the brake system 36 has an ABS function. ABS is an abbreviation for "Anti-lock Braking System". The airbag device 37 absorbs a shock on an occupant of the vehicle 10 by inflating a bag provided in the airbag device 37.

The vehicle 10 includes a control device 20. The control device 20 acquires various signals from the vehicle speed sensor 31, the acceleration sensor 32, the GNSS receiver 33, the accelerator operation amount sensor 34, and the brake operation amount sensor 35. The control device 20 can control the brake system 36 and the airbag device 37 by outputting control signals to the brake system 36 and the airbag device 37. The control device 20 acquires signals indicating operation statuses of the brake system 36 and the airbag device 37 from the brake system 36 and the airbag device 37.

The control device 20 includes an execution unit 21, a storage unit 22, and a communication unit 23. The communication unit 23 can communicate with devices outside the vehicle 10 via a communication network 200. The storage unit 22 stores information and the like acquired by the control device 20. The storage unit 22 prestores various programs. The storage unit 22 includes a read only memory (ROM), a random access memory (RAM), and a storage. The execution unit 21 executes various processes by reading the programs in the storage unit 22. In the present embodiment, one of the programs stored in the storage unit 22 is a part of a program related to road condition monitoring to be executed by the road condition monitoring system 100. Examples of the execution unit 21 include a central processing unit (CPU).

In the present embodiment, the execution unit 21 executes the following process at every predetermined control cycle. Based on the accelerator operation amount ACC and the vehicle speed SP, the execution unit 21 calculates a requested vehicle driving force that is a requested value of a driving force required for the vehicle 10 to travel. Based on the longitudinal acceleration GX, the lateral acceleration GY, and the vertical acceleration GZ, the execution unit 21 calculates a road surface gradient AR that is a gradient of a road surface where the vehicle 10 is located. Based on the requested vehicle driving force, the road surface gradient AR, and the like, the execution unit 21 calculates a predicted longitudinal acceleration GXA that is a predicted value of the acceleration along the longitudinal axis of the vehicle 10.

As shown in FIG. 1, the road condition monitoring system 100 includes a server 50. The server 50 includes an execution unit 51, a storage unit 52, and a communication unit 53. The communication unit 53 can communicate with devices outside the server 50 via the communication network 200. Therefore, the server 50 can communicate with the vehicles 10. The storage unit 52 stores information and the like acquired by the server 50. The storage unit 52 prestores various programs. The storage unit 52 includes a ROM, a RAM, and a storage. The execution unit 51 executes various processes by reading the programs in the storage unit 52. In the present embodiment, one of the programs stored in the storage unit 52 is a part of the program related to the road condition monitoring to be executed by the road condition monitoring system 100. Examples of the execution unit 51 include a CPU.

First Detection Control

Next, first detection control to be executed by the control device 20 of the vehicle 10 will be described with reference to FIG. 2. In the present embodiment, the control device 20 repeatedly executes the first detection control at every predetermined control cycle.

Figure 2:
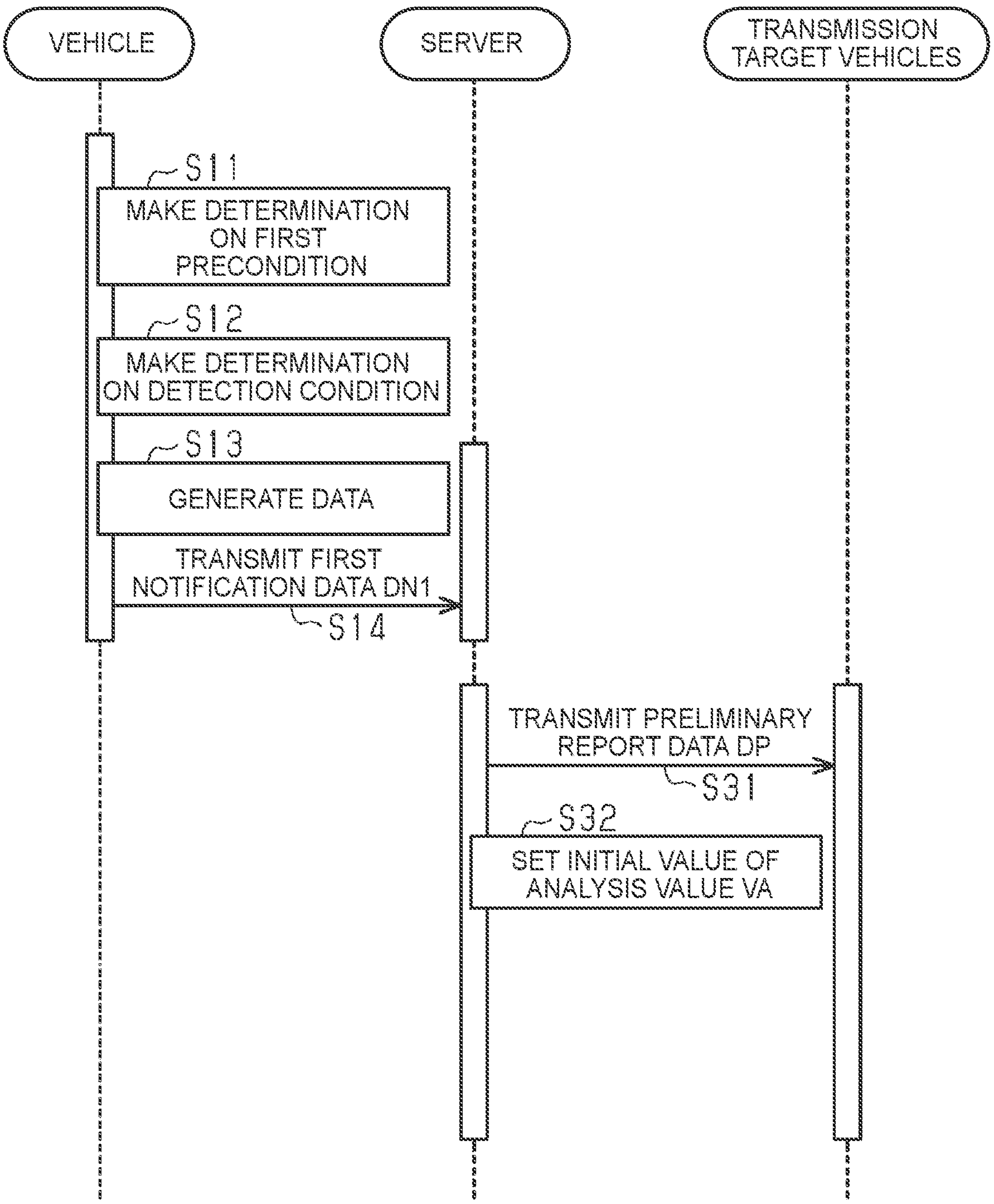
FIG. 2 is a sequence diagram showing first detection control and first distribution control.

As shown in FIG. 2, after the control device 20 has started the first detection control, the control device 20 executes a process of step S11. In step S11, the control device 20 determines whether a predetermined first precondition is satisfied. Examples of the first precondition include a precondition that the amount of change in the vehicle speed SP per unit time is equal to or smaller than a predetermined specified change amount. When the control device 20 determines in step S11 that the first precondition is not satisfied, the control device 20 terminates the current first detection control. Then, the control device 20 advances the process to step S11 again. When the control device 20 determines in step S11 that the first precondition is satisfied, the control device 20 advances the process to step S12.

In step S12, the control device 20 determines whether a predetermined detection condition is satisfied. The detection condition is a condition defined for detecting an abnormality on a road. In the present embodiment, the detection condition includes an accident requirement, an abnormal road surface requirement, a submersion requirement, a low friction requirement, and an obstacle requirement. The accident requirement is a requirement for detecting that an accident has occurred on a road as an abnormality on the road. Examples of the accident requirement include a requirement that the airbag device 37 has been activated. The abnormal road surface requirement is a requirement for detecting an abnormality such as excessive unevenness on a road as an abnormality on the road. Examples of the abnormal road surface requirement include a requirement that the absolute value of the vertical acceleration GZ is equal to or larger than a predetermined specified acceleration. The submersion requirement is a requirement for detecting that a submerged spot is present on a road as an abnormality on the road. Examples of the submersion requirement include a requirement that the absolute value of a difference between the predicted longitudinal acceleration GXA and the longitudinal acceleration GX is equal to or larger than a predetermined specified difference. The low friction requirement is a requirement for detecting that a low friction spot is present on a road as an abnormality on the road. Examples of the low friction requirement include a requirement that the brake system 36 has exerted the ABS function and the brake operation amount BRA is equal to or smaller than a predetermined first operation amount. The obstacle requirement is a requirement for detecting that an obstacle is present on a road as an abnormality on the road. Examples of the obstacle requirement include a requirement that the brake system 36 has exerted the ABS function and the brake operation amount BRA is equal to or larger than a predetermined second operation amount. The control device 20 determines that the detection condition is satisfied when any one of the accident requirement, the abnormal road surface requirement, the submersion requirement, the low friction requirement, and the obstacle requirement is satisfied. When the control device 20 determines in step S12 that the detection condition is not satisfied, the control device 20 terminates the current first detection control. Then, the control device 20 advances the process to step S11 again. When the control device 20 determines in step S12 that the detection condition is satisfied, the control device 20 advances the process to step S13.

In step S13, the control device 20 generates a type code CK, a detection position PD, and a detection time TD. The type code CK indicates the type of the abnormality detected in the process of step S12. For example, when the control device 20 determines in step S12 that the accident requirement is satisfied, the type code CK is an accident code CK1 indicating that an accident has occurred on the road as the abnormality on the road. Similarly, when the control device 20 determines in step S12 that the abnormal road surface requirement is satisfied, the type code CK is an abnormal road surface code CK2 indicating that there is an abnormality of excessive unevenness on the road as the abnormality on the road. When the control device 20 determines in step S12 that the submersion requirement is satisfied, the type code CK is a submersion code CK3 indicating that a submerged spot is present on the road as the abnormality on the road. When the control device 20 determines in step S12 that the low friction requirement is satisfied, the type code CK is a low friction code CK4 indicating that a low friction spot is present on the road as the abnormality on the road. When the control device 20 determines in step S12 that the obstacle requirement is satisfied, the type code CK is an obstacle code CK5 indicating that an obstacle is present on the road as the abnormality on the road. The detection position PD is the position coordinates PC at the time when the process of step S12 has been executed. The detection time TD is the time when the process of step S12 has been executed. After step S13, the control device 20 advances the process to step S14.

In step S14, the control device 20 transmits, to the server 50, first notification data DN1 including the type code CK, the detection position PD, and the detection time TD. As a result, the server 50 receives the first notification data DN1. After step S14, the control device 20 terminates the current first detection control. Then, the control device 20 advances the process to step S11 again.

First Distribution Control

Next, first distribution control to be executed by the server 50 will be described with reference to FIG. 2. In the present embodiment, the server 50 executes the first distribution control every time the server 50 receives the first notification data DN1 generated through the first detection control.

As shown in FIG. 2, after the server 50 has started the first distribution control, the server 50 executes a process of step S31. In step S31, the server 50 transmits, to the vehicles 10, preliminary report data DP indicating that an abnormality has occurred on the road at the detection position PD. The preliminary report data DP includes the type code CK, the detection position PD, and the detection time TD. In the present embodiment, examples of the vehicle 10 to which the preliminary report data DP is to be transmitted include a vehicle 10 located within a predetermined specified distance from the detection position PD. The specified distance is, for example, several kilometers to several tens of kilometers. As a result, the control devices 20 of the vehicles 10 receive the preliminary report data DP. At this time, the control device 20 of each vehicle 10 notifies a driver of the vehicle 10 or the like about the occurrence of the abnormality on the road at the detection position PD via a display or the like in the vehicle 10. After step S31, the server 50 advances the process to step S32.

In step S32, the server 50 sets an initial value of an analysis value VA based on the type code CK in the first notification data DN1. For example, when the type code CK is either the accident code CK1 or the abnormal road surface code CK2, the server 50 sets "200" as the initial value of the analysis value VA. For example, when the type code CK is any one of the submersion code CK3, the low friction code CK4, and the obstacle code CK5, the server 50 sets "100" as the initial value of the analysis value VA. The analysis value VA indicates the degree of influence on traffic congestion at the detection position PD. The analysis value VA indicates that the degree of influence on traffic congestion due to the abnormality on the road increases as the analysis value VA increases. After step S32, the server 50 terminates the current first distribution control.

Second Detection Control

Next, second detection control to be executed by the control device 20 of the vehicle 10 will be described with reference to FIG. 3. In the present embodiment, on the condition that the preliminary report data DP is received, the control device 20 repeatedly executes the second detection control at every predetermined control cycle until a specified period elapses after the reception of the preliminary report data DP. Examples of the specified period include several hours to a dozen of hours.

Figure 3:
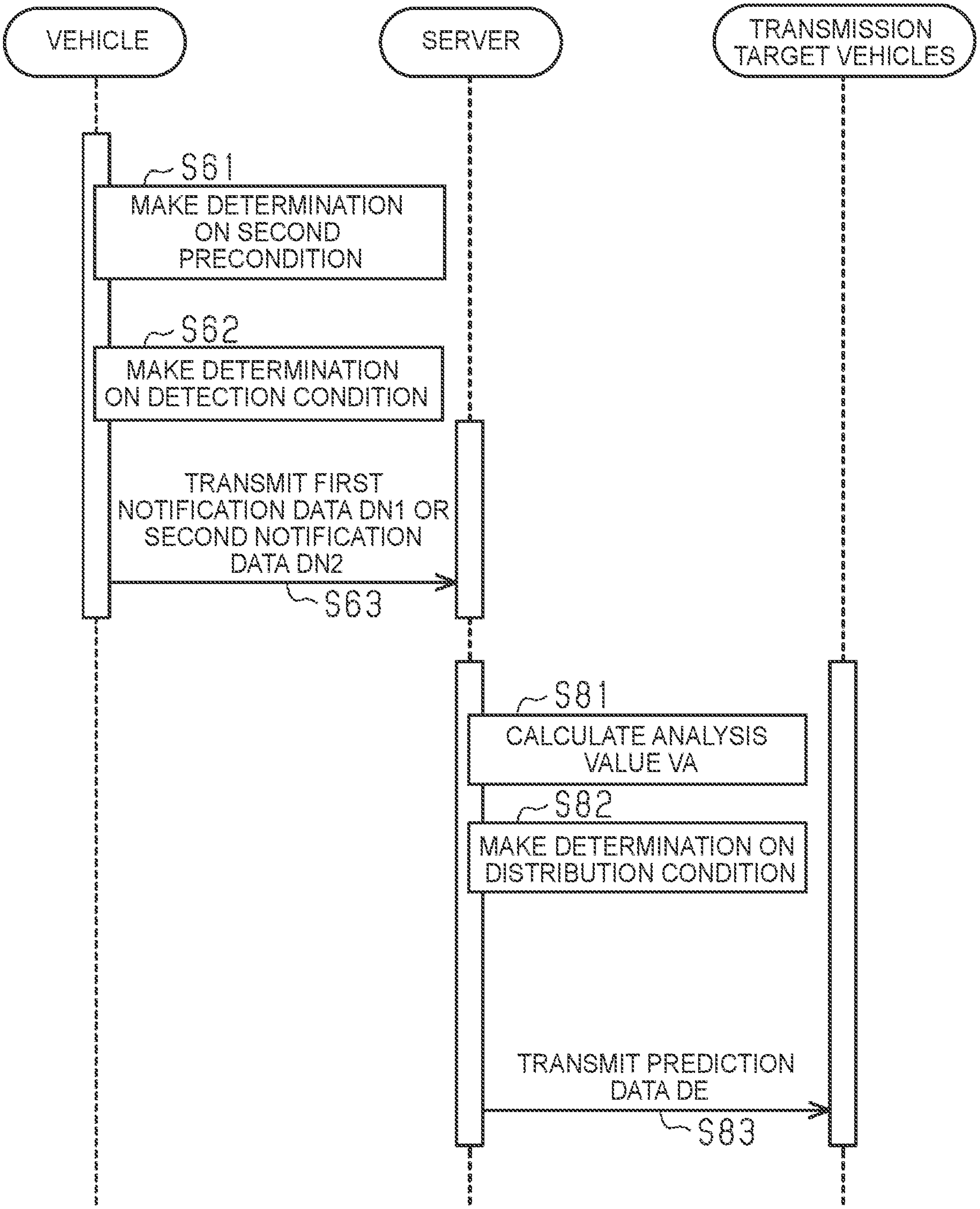
FIG. 3 is a sequence diagram showing second detection control and second distribution control.

As shown in FIG. 3, after the control device 20 has started the second detection control, the control device 20 executes a process of step S61. In step S61, the control device 20 determines whether a predetermined second precondition is satisfied. Examples of the second precondition include a precondition that the vehicle has traveled at the detection position PD in the preliminary report data DP and the amount of change in the vehicle speed SP per unit time is equal to or smaller than the predetermined specified change amount. Regarding the description "the vehicle has traveled at the detection position PD in the preliminary report data DP", the position coordinates PC of the vehicle 10 need not completely agree with the detection position PD and, for example, a deviation of several meters to several tens of meters is permissible. When the control device 20 determines in step S61 that the second precondition is not satisfied, the control device 20 terminates the current second detection control. Then, the control device 20 advances the process to step S61 again. When the control device 20 determines in step S61 that the second precondition is satisfied, the control device 20 advances the process to step S62.

In step S62, the control device 20 determines whether a predetermined detection condition is satisfied. The detection condition in step S62 is the same as the detection condition in step S12. In other words, the process of step S62 is a process of determining whether any abnormality is still detected at the position where determination is made in step S12 that the detection condition is satisfied. The control device 20 advances the process to step S63 after step S62 regardless of whether the control device 20 determines that the detection condition is not satisfied or that the detection condition is satisfied.

In step S63, the control device 20 transmits either the first notification data DN1 or second notification data DN2 to the server 50. Specifically, when the control device 20 determines in step S62 that the detection condition is satisfied, the control device 20 generates the first notification data DN1. Then, the control device 20 transmits the first notification data DN1 to the server 50. The first notification data DN1 in step S63 includes the type code CK, the detection position PD, and the detection time TD as in step S14. The type code CK in step S63 indicates the type of the abnormality detected in the process of step S62. The detection position PD in step S63 is the position coordinates PC at the time when the process of step S62 has been executed. The detection time TD in step S63 is the time when the process of step S62 has been executed. After step S63, the control device 20 terminates the current second detection control. Then, the control device 20 advances the process to step S61 again.

When the control device 20 determines in step S62 that the detection condition is not satisfied, the control device 20 generates the second notification data DN2. Then, the control device 20 transmits the second notification data DN2 to the server 50. The second notification data DN2 does not include the type code CK indicating the type of the abnormality, but includes a non-detection code CN, the detection position PD, and the detection time TD. The non-detection code CN indicates that no abnormality has occurred on the road. After step S63, the control device 20 terminates the current second detection control. Then, the control device 20 advances the process to step S61 again.

Second Distribution Control

Next, second distribution control to be executed by the server 50 will be described with reference to FIG. 3. In the present embodiment, on the condition that the server 50 has received the first notification data DN1 and executed the first distribution control, the server 50 repeatedly executes the second distribution control until a specified period elapses after the execution of the first distribution control. The server 50 executes the second distribution control for each target detection position PD. Examples of the specified period include several hours to a dozen of hours. FIG. 3 illustrates that the server 50 receives the first notification data DN1 or the second notification data DN2 generated through the second detection control. Depending on the travel route of the vehicle 10 and the like, there is a possibility that the server 50 has not received the first notification data DN1 or the second notification data DN2 generated through the second detection control at the time of execution of the second distribution control.

As shown in FIG. 3, after the server 50 has started the second distribution control, the server 50 executes a process of step S81. In step S81, the server 50 calculates the analysis value VA based on a period from the detection time TD to the current time, a reception count of the first notification data DN1, and a reception count of the second notification data DN2. At this time, the server 50 calculates the analysis value VA by correcting the initial value of the analysis value VA set in step S32.

First, calculation of the analysis value VA based on the period from the detection time TD to the current time will be described. Specifically, the server 50 acquires the detection time TD in the first notification data DN1 for the same detection position PD. Then, the server 50 reduces the analysis value VA as the period from the detection time TD in the latest first notification data DN1 to the current time increases. In other words, for the same detection position PD, the server 50 sets the analysis value VA associated with the detection position PD to a value indicating a lower degree of influence on traffic congestion as the period from the detection time TD in the latest first notification data DN1 to the current time increases. In the present embodiment, the server 50 adds "−25" to a correction amount for the initial value of the analysis value VA each time the period from the latest detection time TD to the current time increases by one hour. For example, when the period from the latest detection time TD to the current time is three hours, the correction amount for the initial value of the analysis value VA is "−75".

Next, calculation of the analysis value VA based on the reception count of the first notification data DN1 will be described. For the same detection position PD, the server 50 increases the analysis value VA as the reception count of the first notification data DN1 generated through the second detection control increases. In other words, when the detection position PD in the newly received first notification data DN1 is the same as the detection position PD in the previously received first notification data DN1, the server 50 sets the analysis value VA associated with the detection position PD to a value indicating a high degree of influence on traffic congestion. In the present embodiment, the server 50 adds "+25" to the correction amount for the initial value of the analysis value VA each time the reception count of the first notification data DN1 generated through the second detection control increases by one. For example, when the reception count of the first notification data DN1 generated through the second detection control is three, the correction amount for the initial value of the analysis value VA is "+75". When the analysis value VA has exceeded a predetermined upper limit value, the server 50 sets the analysis value VA to the upper limit value. Examples of the upper limit value include "200".

Calculation of the analysis value VA based on the reception count of the second notification data DN2 will be described. For the same detection position PD, the server 50 reduces the analysis value VA as the reception count of the second notification data DN2 generated through the second detection control increases. In other words, when the server 50 has received the second notification data DN2, the server 50 sets the analysis value VA associated with the detection position PD for which the second notification data DN2 indicates that no abnormality has occurred to a value indicating a low degree of influence on traffic congestion. In the present embodiment, the server 50 adds "−25" to the correction amount for the initial value of the analysis value VA each time the reception count of the second notification data DN2 generated through the second detection control increases by one. For example, when the reception count of the second notification data DN2 generated through the second detection control is three, the correction amount for the initial value of the analysis value VA is "−75". After step S81, the server 50 advances the process to step S82.

In step S82, the server 50 determines whether a predetermined distribution condition that the analysis value VA indicates a high degree of influence on traffic congestion is satisfied. The distribution condition is that the analysis value VA is larger than a predetermined reference value. Examples of the reference value include "100".

When the server 50 determines in step S82 that the distribution condition is not satisfied, the server 50 terminates the current second distribution control. Then, the server 50 advances the process to step S81 again. When the server 50 determines in step S82 that the distribution condition is satisfied, the server 50 advances the process to step S83.

In step S83, the server 50 transmits, to the vehicles 10, prediction data DE indicating a strong possibility of the occurrence of traffic congestion at the detection position PD. In the present embodiment, examples of the vehicle 10 to which the prediction data DE is to be transmitted include a vehicle 10 that has received the preliminary report data DP. As a result, the control devices 20 of the vehicles 10 receive the prediction data DE. At this time, the control device 20 of each vehicle 10 notifies the driver of the vehicle 10 or the like about the strong possibility of the occurrence of traffic congestion at the detection position PD via the display or the like in the vehicle 10. After step S83, the server 50 terminates the current second distribution control. Then, the server 50 advances the process to step S81 again.

Operations of Embodiment

For example, it is assumed that an obstacle is present at a specific point on a road. It is also assumed that a certain vehicle 10 passes through the specific point. In this case, the control device 20 of the vehicle 10 transmits the first notification data DN1 to the server 50 through the first detection control executed by the control device 20 of the vehicle 10. Then, the server 50 transmits the preliminary report data DP to the vehicles 10 through the first distribution control executed by the server 50. It is assumed that the vehicle 10 that has received the preliminary report data DP has passed through the specific point, that is, the detection position PD in the preliminary report data DP. In this case, the control device 20 of the vehicle 10 that has passed through the detection position PD transmits either the first notification data DN1 or the second notification data DN2 to the server 50 through the second detection control executed by the control device 20 of the vehicle 10. When determination is made, in step S82 in the second distribution control executed by the server 50, that the distribution condition is satisfied, that is, the analysis value VA is larger than the predetermined reference value, the server 50 transmits the prediction data DE to the vehicles 10.

Effects of Embodiment (1) In the present embodiment, when an abnormality on a road is detected, the server 50 can grasp that the abnormality has occurred on the road by receiving the first notification data DN1 through the first detection control. Then, the driver or the like of the vehicle 10 that has received the preliminary report data DP through the first distribution control can predict by himself/herself that traffic congestion may occur at the detection position PD in the preliminary report data DP. The analysis value VA indicating the degree of influence on traffic congestion at the detection position PD is calculated through the first distribution control and the second distribution control executed by the server 50. When the distribution condition, that is, the condition that the analysis value VA indicates a high degree of influence on traffic congestion is satisfied through the second distribution control executed by the server 50, the prediction data DE indicating a strong possibility of the occurrence of traffic congestion at the detection position PD is transmitted to the vehicles 10. Therefore, the driver or the like of the vehicle 10 that has received the preliminary report data DP and the prediction data DE can grasp in advance not only that the abnormality has occurred on the road, but also that there is a strong possibility of the occurrence of traffic congestion due to the abnormality.

(2) Even when the vehicle 10 has detected the abnormality on the road, there is generally a strong possibility that the abnormality on the road will be resolved over time. Therefore, the traffic congestion due to the abnormality on the road tends to be resolved over time. In this regard, in step S81 of the second distribution control, the server 50 calculates the analysis value VA based on the period from the detection time TD in the latest first notification data DN1 to the current time. Therefore, the analysis value VA can be calculated more accurately than in a case where the elapsed period from the detection time TD in the latest first notification data DN1 is not considered.

(3) In a situation where the vehicles 10 detect the abnormality on the road multiple times, there is generally a tendency that the degree of influence on traffic congestion due to the abnormality on the road increases. In this regard, in step S81 of the second distribution control, the server 50 increases the analysis value VA as the reception count of the first notification data DN1 generated through the second detection control increases. Therefore, the analysis value VA can be calculated more accurately than in a case where the detection count of the abnormality on the road is not considered.

(4) For example, when a certain vehicle 10 detects the abnormality on the road but another vehicle 10 that passes through the detection position PD of that detection does not detect the abnormality on the road, the abnormality on the road may already be resolved. In this case, there is a strong possibility that the traffic congestion due to the abnormality on the road has also been resolved. In this regard, in step S81 of the second distribution control, the server 50 reduces the analysis value VA as the reception count of the second notification data DN2 generated through the second detection control increases. Therefore, the analysis value VA can be calculated more accurately by considering the non-detection count of the abnormality on the road in the second detection control.

Modifications

The present embodiment can be modified as follows. The present embodiment and the following modifications may be combined as long as no technical contradiction arises.

In the above embodiment, the first detection control may be changed. For example, the first precondition in step S11 may be changed. As a specific example, when the amount of change in a steering angle per unit time by the driver of the vehicle 10 is large, erroneous determination may be made in step S12 that the detection condition is satisfied. Therefore, the first precondition in step S11 may include a precondition that the amount of change in the steering angle per unit time by the driver of the vehicle 10 is equal to or smaller than a predetermined constant value. That is, other requirements may be adopted as the first precondition in step S11 to remove noise in the process of step S12.

For example, the detection condition in step S12 may be changed. As a specific example, the detection condition may include only a part of the accident requirement, the abnormal road surface requirement, the submersion requirement, the low friction requirement, and the obstacle requirement.

For example, the accident requirement in step S12 may be a requirement that the absolute value of the longitudinal acceleration GX is equal to or larger than a predetermined specified acceleration.

For example, the low friction requirement in step S12 may be a requirement that so-called VDIM is operating. VDIM is an abbreviation for "Vehicle Dynamics Integrated Management". The VDIM is a system for stably controlling the attitude of the vehicle 10.

For example, the obstacle requirement in step S12 may be a requirement that a function of automatically applying brakes to reduce damage of collision to the vehicle 10 is operating. For example, the obstacle requirement in step S12 may be a requirement that an operation of changing lanes of the vehicle 10 from a first lane to a second lane and then immediately changing lanes from the second lane to the first lane, that is, a so-called double lane change operation is detected. When the detection condition in step S12 is changed, it is appropriate that the detection condition in step S62 be similarly changed.

In the above embodiment, the second detection control may be changed. For example, the second precondition in step S61 or the detection condition in step S62 may be changed as in the first detection control.

In the above embodiment, the first distribution control may be changed. For example, the configuration for setting the initial value of the analysis value VA in step S32 may be changed. As a specific example, in step S32, the server 50 may set the same value as the initial value of the analysis value VA regardless of the type code CK in the first notification data DN1.

In the above embodiment, the second distribution control may be changed. For example, the configuration for calculating the analysis value VA based on the period from the detection time TD to the current time in step S81 may be changed. As a specific example, the correction amount for the initial value of the analysis value VA each time the period from the latest detection time TD to the current time increases by one hour is not limited to "−25", and may be larger than "−25" or smaller than "−25" as long as the value is the negative value. As a specific example, the server 50 may calculate the analysis value VA regardless of the period from the detection time TD to the current time.

For example, the configuration for calculating the analysis value VA based on the reception count of the first notification data DN1 in step S81 may be changed. As a specific example, the correction amount for the initial value of the analysis value VA each time the reception count of the first notification data DN1 generated through the second detection control increases by one is not limited to "+25", and may be larger than "+25" or smaller than "+25" as long as the value is the positive value. The correction amount for the initial value of the analysis value VA each time the reception count of the first notification data DN1 generated through the second detection control increases by one may be changed depending on the type code CK in the first notification data DN1. The correction amount for the initial value of the analysis value VA each time the reception count of the first notification data DN1 generated through the second detection control increases by one may be changed depending on the prevalence of the vehicles 10 capable of executing the second detection control. As a specific example, the server 50 may calculate the analysis value VA regardless of the reception count of the first notification data DN1.

For example, the configuration for calculating the analysis value VA based on the reception count of the second notification data DN2 in step S81 may be changed. As a specific example, the correction amount for the initial value of the analysis value VA each time the reception count of the second notification data DN2 generated through the second detection control increases by one is not limited to "−25", and may be larger than "−25" or smaller than "−25" as long as the value is the negative value. The correction amount for the initial value of the analysis value VA each time the reception count of the second notification data DN2 generated through the second detection control increases by one may be changed depending on the prevalence of the vehicles 10 capable of executing the second detection control. As a specific example, the server 50 may calculate the analysis value VA regardless of the reception count of the second notification data DN2.

For example, in step S81, the server 50 may calculate the analysis value VA based on the vehicle speed SP when the vehicle 10 that has received the preliminary report data DP passes through the detection position PD. As a specific example, the server 50 may increase the analysis value VA as the vehicle speed SP when the vehicle 10 passes through the detection position PD decreases.

The degree of influence on traffic congestion due to an abnormality on a road may vary depending on various factors. Therefore, a trained model that has undergone machine learning in advance may be used as the configuration for calculating the analysis value VA. For example, as the above configuration, there may be adopted a configuration in which a plurality of input variables including a variable indicating the period from the detection time TD to the current time is input to the trained model that has undergone machine learning in advance to output an output variable indicating the analysis value VA.

In the above embodiment, the targets of transmission of the preliminary report data DP and the prediction data DE in the first distribution control and the second distribution control are not limited to the vehicles 10. For example, the server 50 may transmit one or more of the preliminary report data DP and the prediction data DE to an administrative agency that manages roads. Thus, it is possible to increase the possibility that the abnormality on the road will be resolved quickly.

What is claimed is:

1. A road condition monitoring system comprising:

vehicles; and a server configured to communicate with the vehicles, wherein each of the vehicles is configured to:

determine whether a predetermined first precondition is satisfied, the predetermined first precondition being an amount of change in a vehicle speed per unit time equal to or smaller than a predetermined specified change amount, determine whether an abnormality is detected on the road in response to determining that the predetermined first precondition is satisfied, and transmit to the server, when the abnormality on the road is detected, first notification data including a type of the abnormality, a detection position at which the abnormality is detected, and a detection time at which the abnormality is detected, and the server includes one or more processors configured to, when the first notification data is received, transmit, to the vehicles, preliminary report data indicating that the abnormality has occurred at the detection position, when the first notification data is received, calculate an analysis value indicating a degree of influence on traffic congestion at the detection position based on the detection time, and when a condition that the analysis value indicates a high degree of influence on the traffic congestion is satisfied, transmit, to the vehicles, prediction data indicating that a possibility of occurrence of the traffic congestion at the detection position is high.

2. The road condition monitoring system according to claim 1, wherein the one or more processors are configured to, for the same detection position, set the analysis value associated with the detection position to a value indicating a lower degree of influence on the traffic congestion as a period from the detection time in the latest first notification data to a current time increases.

3. The road condition monitoring system according to claim 1, wherein the one or more processors are configured to, when the detection position in newly received first notification data is the same as the detection position in previously received first notification data, set the analysis value associated with the detection position to a value indicating a high degree of influence on the traffic congestion.

4. The road condition monitoring system according to claim 1, wherein:

each of the vehicles is configured to:

determine whether a second precondition is satisfied, the second precondition being one of the vehicles having been traveled at the detection position after reception of the preliminary report data, and the amount of change in the vehicle speed per unit time of the one of the vehicles equal to or smaller than the predetermined specified change amount, determine whether the abnormality is detected on the road in response to determining that the second precondition is satisfied, when the abnormality is not detected while the one of the vehicles is traveling at the detection position, transmit, to the server, second notification data indicating that the abnormality has not occurred at the detection position;

when the abnormality is detected while the one of the vehicles is traveling at the detection position, transmit, to the server, the first notification data indicating that the abnormality has occurred as the detection position; and the one or more processors are configured to, when the second notification data is received, set the analysis value associated with the detection position for which the second notification data indicates that the abnormality has not occurred to a value indicating a low degree of influence on the traffic congestion.

5. The road condition monitoring system according to claim 1, wherein each of the vehicles is configured to notify a driver of each of the vehicles that the abnormality has occurred at the detection position and that the possibility of the occurrence of the traffic congestion at the detection position is high.

6. The road condition monitoring system according to claim 1, wherein the abnormality includes at least one of a submerged spot, a low friction spot, or an obstacle being present on a road.

7. The road condition monitoring system according to claim 1, wherein the first precondition further includes an amount of change in a steering angle per unit time being equal to or smaller than a predetermined constant value.

8. The road condition monitoring system according to claim 1, wherein the analysis value is changed based on a type of the abnormality detected.

9. The road condition monitoring system according to claim 1, wherein the abnormality is detected in a case where an airbag device of one of the vehicles is activated.

10. The road condition monitoring system according to claim 1, wherein the abnormality is detected in a case where an absolute value of a vertical acceleration of one of the vehicles is equal to or larger than a predetermined specified accelerated.

11. The road condition monitoring system according to claim 1, wherein the abnormality is detected in a case where a brake system of one of the vehicles exerts the anti-lock braking system function and a brake operation amount is equal to or smaller than a predetermined operation amount.

* * * * *